United States Patent [19]

Strout et al.

[11] Patent Number: 5,549,023
[45] Date of Patent: Aug. 27, 1996

[54] ON-CAR DISC BRAKE LATHE

[75] Inventors: D. Wayne Strout; Thomas L. Crandall, both of York, Pa.; Michael J. Slater, Mississauga, Canada; Erik Malmmose, Odense, Denmark

[73] Assignees: RTI Technologies, Inc., York, Pa.; Canvik A/S, Vissenbjerg, Denmark

[21] Appl. No.: 314,773

[22] Filed: Sep. 29, 1994

[51] Int. Cl.⁶ .................................................. B23B 5/04
[52] U.S. Cl. ............................... 82/112; 82/134; 82/904
[58] Field of Search ........................... 82/112–115, 118, 82/119, 133, 134, 904, 905; 29/27 R, 27 A; 188/379; 248/636; 267/137

[56] References Cited

U.S. PATENT DOCUMENTS

| | | | |
|---|---|---|---|
| 3,473,435 | 10/1969 | Tse et al. | 82/904 X |
| 3,744,353 | 7/1973 | Rohs | 82/904 X |
| 3,845,827 | 11/1974 | Schulin | 267/137 X |
| 4,226,146 | 10/1980 | Ekman . | |
| 4,452,111 | 6/1984 | Anderson | 82/112 |
| 4,523,499 | 6/1985 | Aldridge et al. | 82/112 |
| 4,604,834 | 8/1986 | Thompson | 82/904 X |
| 5,095,786 | 3/1992 | Bellinghausen et al. | 82/112 |
| 5,279,192 | 1/1994 | Hartman | 82/112 |

FOREIGN PATENT DOCUMENTS

| | | | |
|---|---|---|---|
| 2447776 | 10/1980 | France | 82/904 |
| 4220290A1 | 12/1993 | Germany | 82/112 |
| 60-127903 | 7/1985 | Japan | 82/904 |

*Primary Examiner*—S. Thomas Hughes
*Attorney, Agent, or Firm*—Antonelli, Terry, Stout & Kraus

[57] ABSTRACT

A disc brake lathe for machining a brake disc on a vehicle without removing the brake disc from the vehicle but only the wheel and other parts of the brake mechanism. The disc brake lathe comprises a power drive unit for rotating a brake disc on the vehicle and a lathe head having at least one cutting tool for machining a brake disc while the brake disc on the vehicle is rotated by the power drive unit. The lathe head is adapted to be mounted on the vehicle for machining a brake disc on the vehicle and includes a motor for power feeding of the at least one cutting tool during machining. The vibration of the lathe head during machining, which causes rough surface finish on the machined brake discs, is avoided or reduced by the provision of a vibration dampener which is attached to the lathe head for absorbing energy of vibration. The frequency of vibration of the lathe head during machining is also adjustable through the provision of controls for adjusting the rate of power feeding of the at least one cutting tool during machining and for adjusting the speed at which the power drive unit rotates the brake disc during machining whereby the amplifying effects of resonance can be avoided by adjustment of the frequency of vibration of the lathe head.

20 Claims, 10 Drawing Sheets

ON-CAR DISC BRAKE LATHE

RELATED APPLICATION

Application Ser. No. 08/304,442, filed Sep. 12, 1994, for On-Car Disc Brake Lathe discloses an on-car disc brake lathe with an adjustable means for controlling the current to an electric motor of the lathe which feeds tools of the lathe for resurfacing. The current is controlled in relation to the position of the resurfacing tools.

BACKGROUND OF THE INVENTION

Lathes designed to mount on a work bench to machine automotive brake discs, e.g. rotors, have been in existence for many years. Many of these lathes machine both brake discs and brake drums. The brake disc is removed from the vehicle and mounted to the spindle of the bench mounted brake lathe. More recently, a new type of lathe was developed that machines the brake disc without removing the brake disc from the vehicle, in other words a disc brake lathe that machines the disc on the vehicle.

The first on-the-vehicle disc brake lathes used the vehicle's engine power to rotate the brake disc during machining. Later, a separate power drive unit was added. More recently, the drive unit and the lathe have been combined in one integrated version. See U.S. Pat. No. 4,226,146. While on-the-vehicle brake lathes are intended to perform a similar function to bench mounted lathes as to machining a brake disc, there have been problems with prior attempts to make a light weight, fully functional on-the-vehicle disc brake lathe with similar features and functional capability to a bench mounted lathe.

Disc brake lathes are subject to vibration. Vibration can occur as the metal is being cut from the often uneven surface of a used brake disc or due to inconsistencies in the hardness of the brake disc material itself. This vibration can cause the rotor to resonate or ring like a bell and cause a poor surface finish on the rotor. Bench mounted lathes and other metal machining tools address this problem by making the lathe or tool very heavy such that the mass thereof sometimes is nearly one hundred times the mass of the brake disc. However, such a solution is not practical in an on-the-vehicle disc brake lathe where, in order to make the lathe easily portable, it is preferred that the weight or mass of the lathe head be limited to about five times the weight or mass of the brake disc. In machining a brake disc with an on-the-vehicle disc brake lathe, as long as the wheel bearing on the vehicle is sufficiently strong and rigid to make a solid connection between the brake disc and the mass of the car, vibration is not a problem. However, in some cases the bearing may have some small amount of play and the brake disc is therefore free to impart vibration to the lathe head. There is a need for an improved on-the-vehicle brake disc lathe which reduces or eliminates vibration of the lathe head thereby permitting an improved machined surface finish on the brake disc and increased machining speed.

During set up and machining of a brake disc with the conventional on-the-vehicle disc brake lathe, the brake disc on the vehicle and the coupling mechanism connecting the power drive to the brake disc are rotating at high speed. Under these circumstances there is a hazard in that the operator's clothing or power cords for the lathe could possibly become entangled in the rotating parts. There is a need for an improved on-the-vehicle disc brake lathe permitting safer use of the brake lathe.

SUMMARY OF INVENTION

An object of the present invention is to provide an improved disc brake lathe for machining a brake disc on a vehicle without removing the brake disc on the vehicle but only the wheel and other parts of the brake mechanism, which disc brake lathe solves or reduces the aforementioned problem of lathe head vibration during machining. Another object of the invention is to provide a disc brake lathe of the aforementioned kind having improved safety, especially in the instance where continued operation of the lathe is found to present a safety hazard to the operator.

A further object of the present invention is to provide an improved disc brake lathe which not only permits machining a brake disc on a vehicle without removing the brake disc from the vehicle but only the wheel and other parts of the brake mechanism, but also allows machining of brake discs off the vehicle.

These and other objects of the invention are attained by the improved brake disc lathe of the invention which comprises a power drive unit for rotating a brake disc on the vehicle, and a lathe head having at least one cutting tool for machining a brake disc while the brake disc on the vehicle is rotated by the power drive unit. The lathe head is adapted to be mounted on the vehicle for machining a brake disc on a vehicle. The lathe head includes a motor for power feeding of the at least one cutting tool during machining, and means for reducing vibration of the lathe head during machining for improving the surface finish of machined brake discs. According to one feature of the invention, the means for reducing vibration of the lathe head includes a vibration dampener attached to the lathe head.

The vibration dampener in a disclosed embodiment of the invention comprises a free mass which is connected to a stationary mass by way of an energy absorbing medium, the stationary mass being secured on the lathe head. The inertia of the free mass reduces the amplitude of vibration of the lathe head by providing a countervailing force to the vibration of the brake disc during machining with the hysteresis of the energy absorbing medium absorbing energy.

The means for reducing vibration of the brake lathe also includes means for adjusting the frequency of vibration of the lathe head during machining so that the amplifying effects or resonance can be avoided. In a disclosed embodiment of the invention, the means for adjusting the frequency of vibration of the lathe head includes means for adjusting the rate of power feeding of the at least one cutting tool of the lathe head during machining and means for adjusting the speed at which the power drive unit rotates the brake disc during machining. This combination of controls for machining enables the operator to adjust the frequency of vibration up or down to avoid the amplifying effects of resonant. Together with the use of the aforementioned vibration dampener, the problem of vibration during machining with the on-the-vehicle disc brake lathe can be significantly reduced for improving the surface finish of the machined brake disc and allowing increased machining speed.

An emergency stop actuator is also preferably provided on the improved disc brake lathe of the invention. Actuation of the emergency stop actuator by an operator is effective to stop both the feeding of the at least one tool of the lathe head and the rotation of the brake disc by the power drive unit. This is accomplished in the disclosed embodiment by interrupting the electrical power supply to the power drive unit and the lathe head for stopping their drives in a very short period of time. The emergency stop actuator is conveniently located on the brake lathe so that an operator may quickly interrupt a lathe machining operation in case the operator's clothing or a power cord becomes entangled in rotating parts of the lathe, thereby improving the safety of operation of the lathe.

Another aspect of the present invention is that the disc brake lathe can further comprise, a bench mounted power drive unit for rotating a brake disc which has been removed from a vehicle. A holding device is provided on the bench mounted power drive unit onto which a brake disc which has been removed from the vehicle can be mounted for rotation by the bench mounted power drive unit. Means for attaching the lathe head of the lathe to the bench mounted power drive unit are also provided whereby the lathe head can be used as the machining mechanism with the bench mounted power drive unit to allow machining of brake discs off the vehicle. This combination provides the flexibility of being able to machine brake discs on or off the vehicle.

These and other objects, features and advantages of the present invention will become more apparent from the following description when taken in connection with the accompanying drawings which show, for purposes of illustration only, one embodiment in accordance with the present invention.

DETAILED DESCRIPTION OF THE PREFERRED EMBODIMENT

Figure 1:
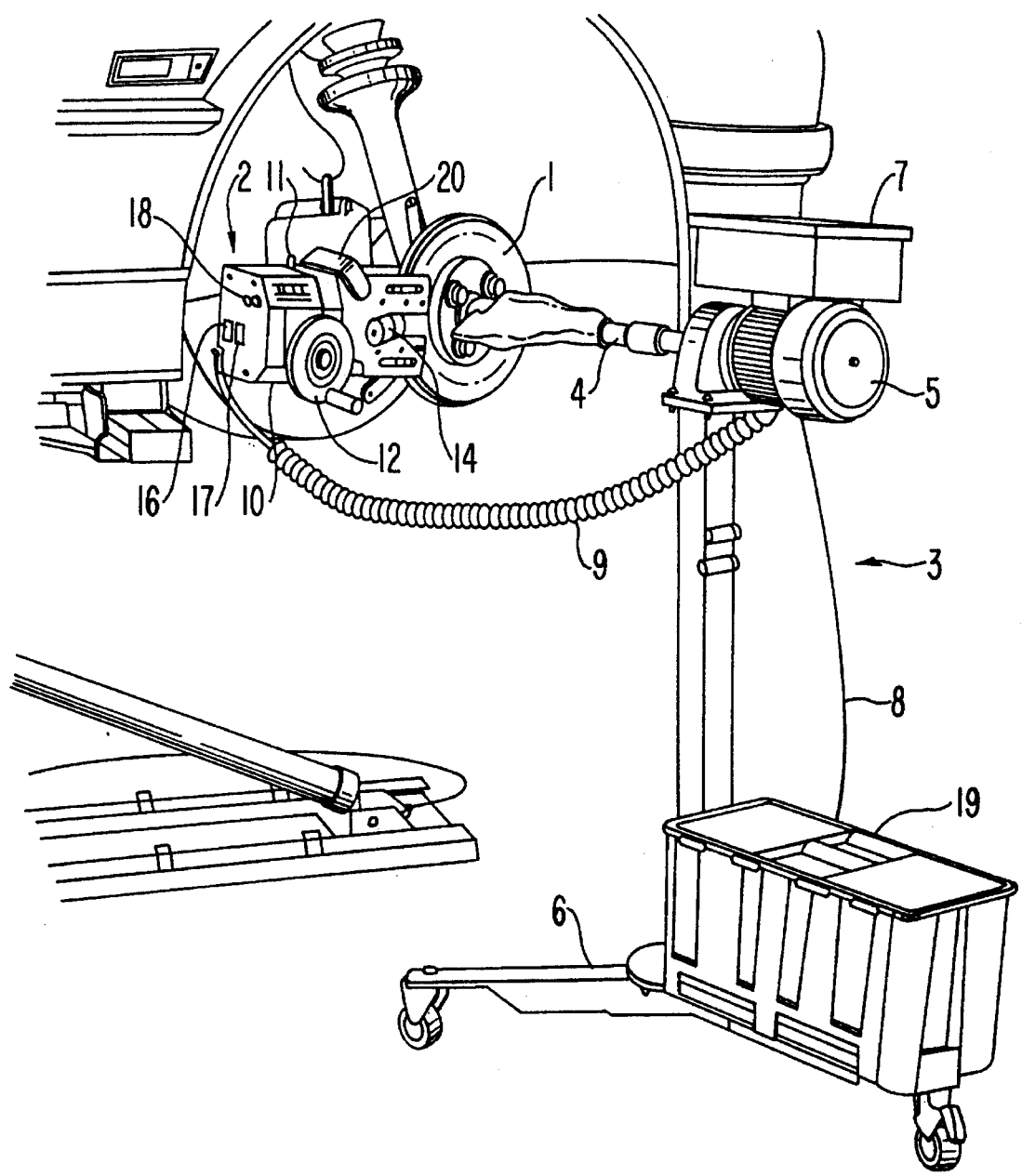
FIG. 1 is a side elevational view of a resurfacing process of a brake disc applying an on-car disc brake lathe according to the invention.

FIG. 1 shows a resurfacing process applying a disc brake lathe according to the invention. A wheel and the brake calipers are removed from an automobile, which is shown in a raised portion on a hydraulic lift or jack, so that the brake disc 1 which remains mounted on the wheel axle can be resurfaced. Thus, with the device according to the invention it is possible to resurface a brake disc without removing it from the automobile.

A disc brake lathe unit or head 2 is mounted by means of bolts etc. on the wheel suspension in the holes which are free now as the brake calipers have been removed. On each side the lathe head 2 is a tool holder 14 with a tool 15, for example a negative rake carbide cutting tip of a generally known type with six cutting edges. These carbide cutting tips are used for the resurfacing of respective side surfaces of the brake disc.

The brake disc 1 is caused to rotate by a motor 5 of a power drive unit 3 of the lathe through a shaft 4 in a generally known manner. The motor 5 is controlled and supplied with power by a unit 7 of the power drive unit 3 which through a power line 8 is connected to the power mains, in this case to a 110 volt supply line. The motor 5 and unit 7 of the power drive unit 3 are placed on a tripod 6 with wheels which can be locked. The tripod may comprise a storage box 19 for the storing of the lathe head 2 and any accessories.

The disc brake lathe head 2 comprises a motor housing 10 under which is situated an electric geared motor 30, which through an electric cable 9 is supplied with electrical power by the unit 7. The electric geared motor 30 of the lathe head is supplied with 12 volt DC in the disclosed embodiment. By means of a shift lever 11 the geared motor can be brought into engagement with the sliding holders 13 where tool holders 14 and tools 15 are mounted.

Figure 7:
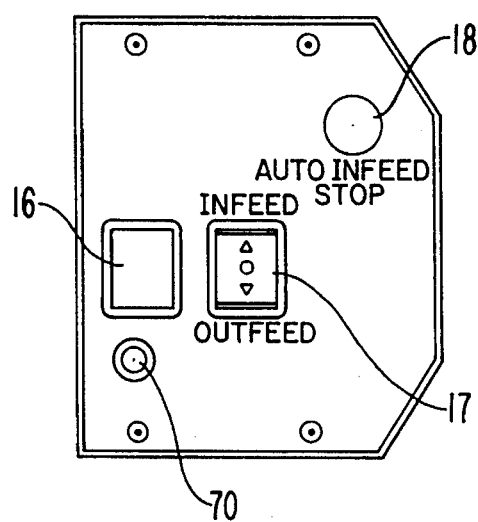
FIG. 7 is an end view of the lathe head showing the end thereof opposite that depicted in FIG. 6 and illustrating several lathe head controls and an on/off indicator light.

Additionally, the disc brake lathe head 2 comprises a hand wheel 12 which likewise by means of the shift lever 11 can be brought into engagement with the sliding holders 13. The reference numeral 16 indicates an on/off lamp which is switched on when the geared motor in the housing 10 has been started by means of the 3-position switch 17 which is shown more clearly in FIG. 7, so that the sliding holders 13 are either guided towards the center of the brake disc 1, or away from the center.

Figure 11:
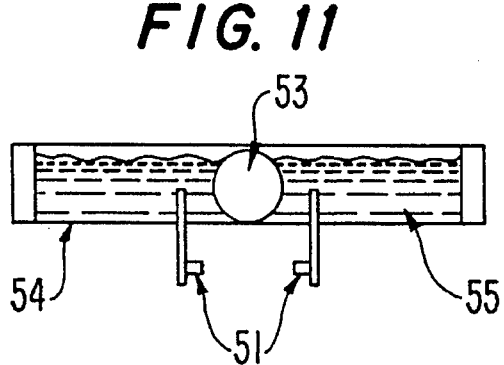
FIG. 11 is a sectional view along the longitudinal central axis of the transverse vibration dampener for the lathe of FIG. 1, as shown in FIG. 12.
Figure 12:
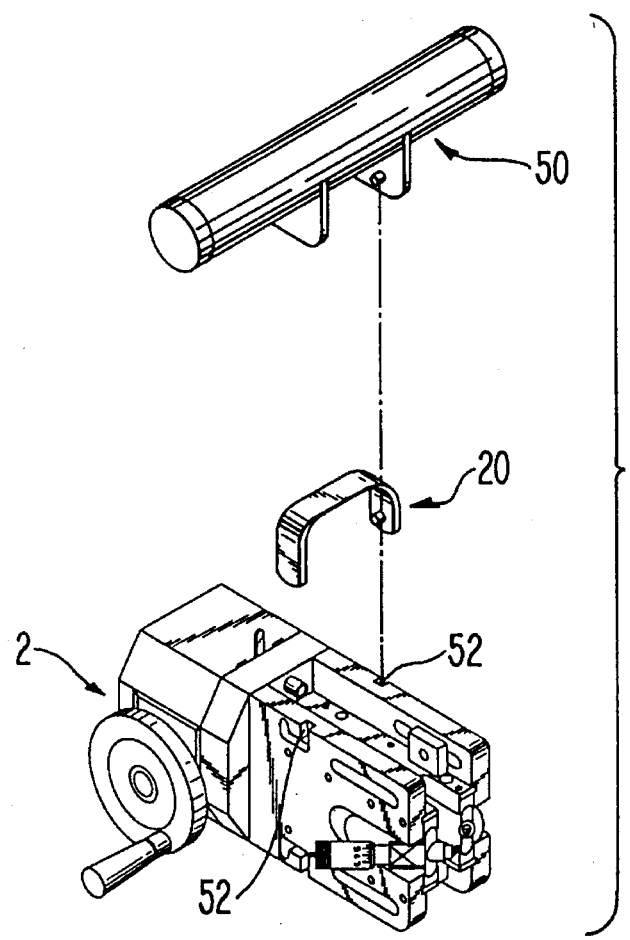
FIG. 12 is a side elevational view of the lathe head showing a handle and a transverse vibration dampener in disassembled relation with the lathe head, but each being capable of being mounted on the same lathe head mounting holes.

The disc brake lathe head 2 also comprises a handle 20 for transportation and a transverse vibration dampener 43, see Figs. 11 and 12 which are interchangeably mounted at the same site on the lathe head, as discussed hereinafter. A further essential member 18 which is provided as a setting device for stopping the geared motor 30 in the housing 10 is explained later in connection with FIGS. 2–5 of the drawing as disclosed in the aforesaid application Ser. No. 08/304,442.

Figure 2:
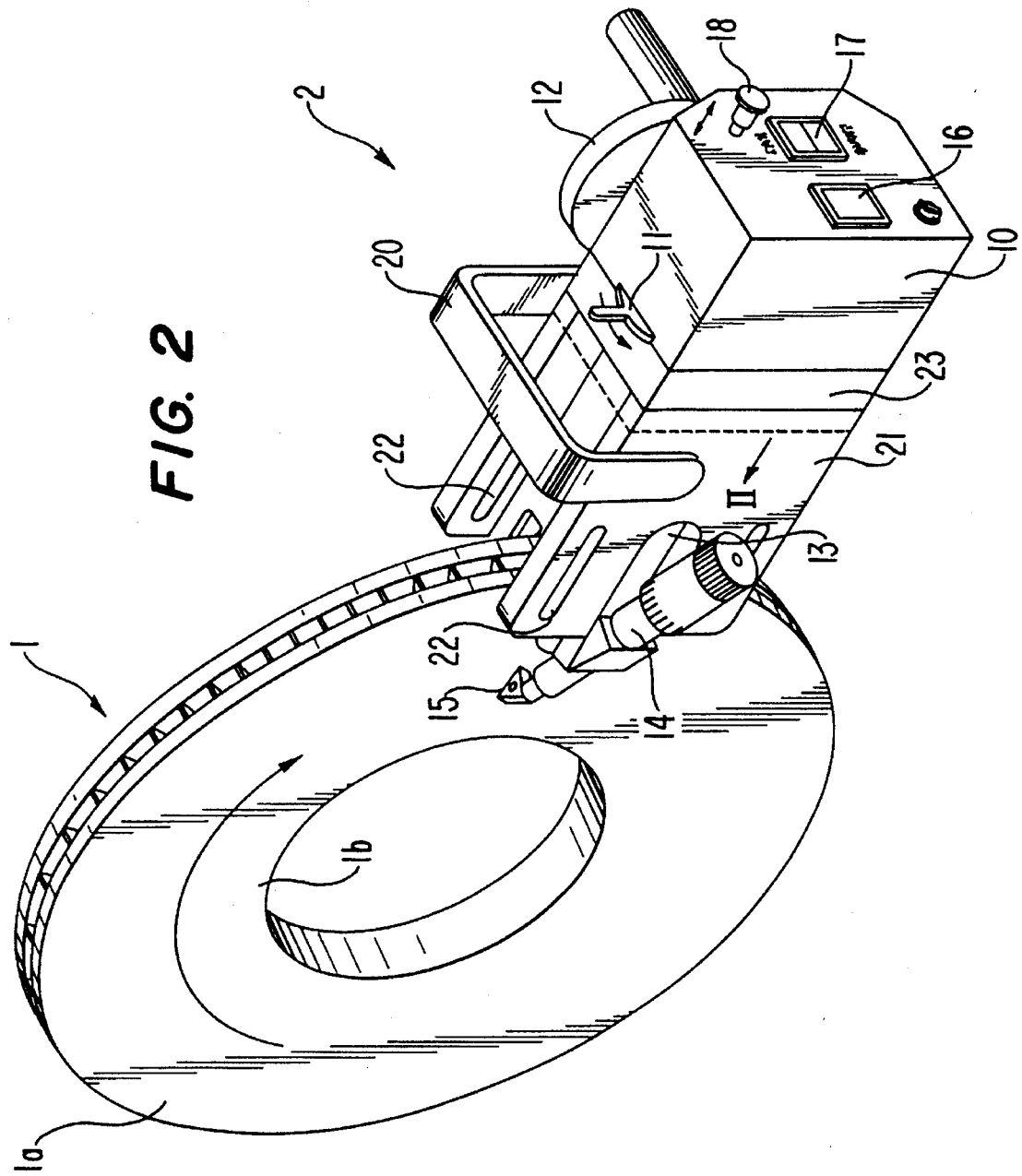
FIG. 2 shows the actual lathe head/resurfacing unit of the disc brake lathe in the process of machining a brake disc from the side of the lathe head opposite that shown in FIG. 1.

FIG. 2 shows the disc brake lathe head 2 alone and in the process of resurfacing a brake disc 1. In addition to the already mentioned parts, the lathe head 2 comprises a housing 21 in which is shown oblong mounting holes 22, which are used for the mounting the lathe head 2 on the wheel suspension of an automobile. Between the housing 21 and the gear housing 10 is seen a motor plate 23 which forms the basis for the mounting of the geared motor, further toothed wheels etc., which are explained in further detail in connection with FIGS. 4 and 5 of the drawings. The setting device 18 is moreover shown in further detail, which device can be moved in the direction shown by the double-arrow for the setting of the above-mentioned positioning member, which can stop the geared motor in the housing 10 by switching off the power supply to the motor.

Figure 3:
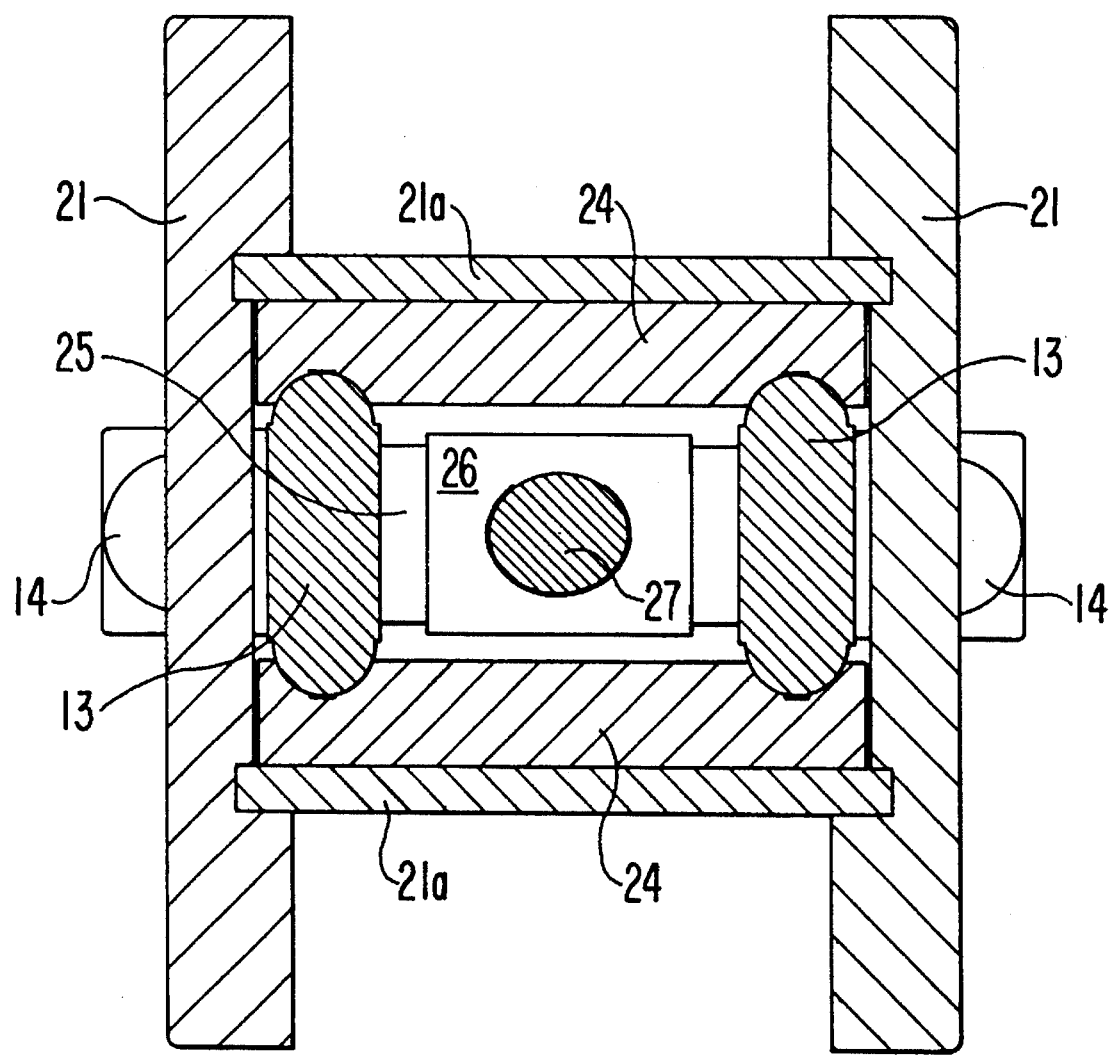
FIG. 3 shows a plane section III—III in FIG. 2 on a larger scale.

In FIG. 3 is seen a section through the housing 21 comprising transverse housing parts 21a which support the adjustable guides 24 for the two sliding holders 14 on which the tool holders 14 are secured. The two sliding holders 13 are coupled firmly together by a bridging part 25 which centrally comprises a threaded sleeve 26 for a threaded spindle 27. If the threaded spindle 27 is turned, both sliding holders 113 will simultaneously be guided either out of or into the housing 21, of FIG. 2.

Figure 4:
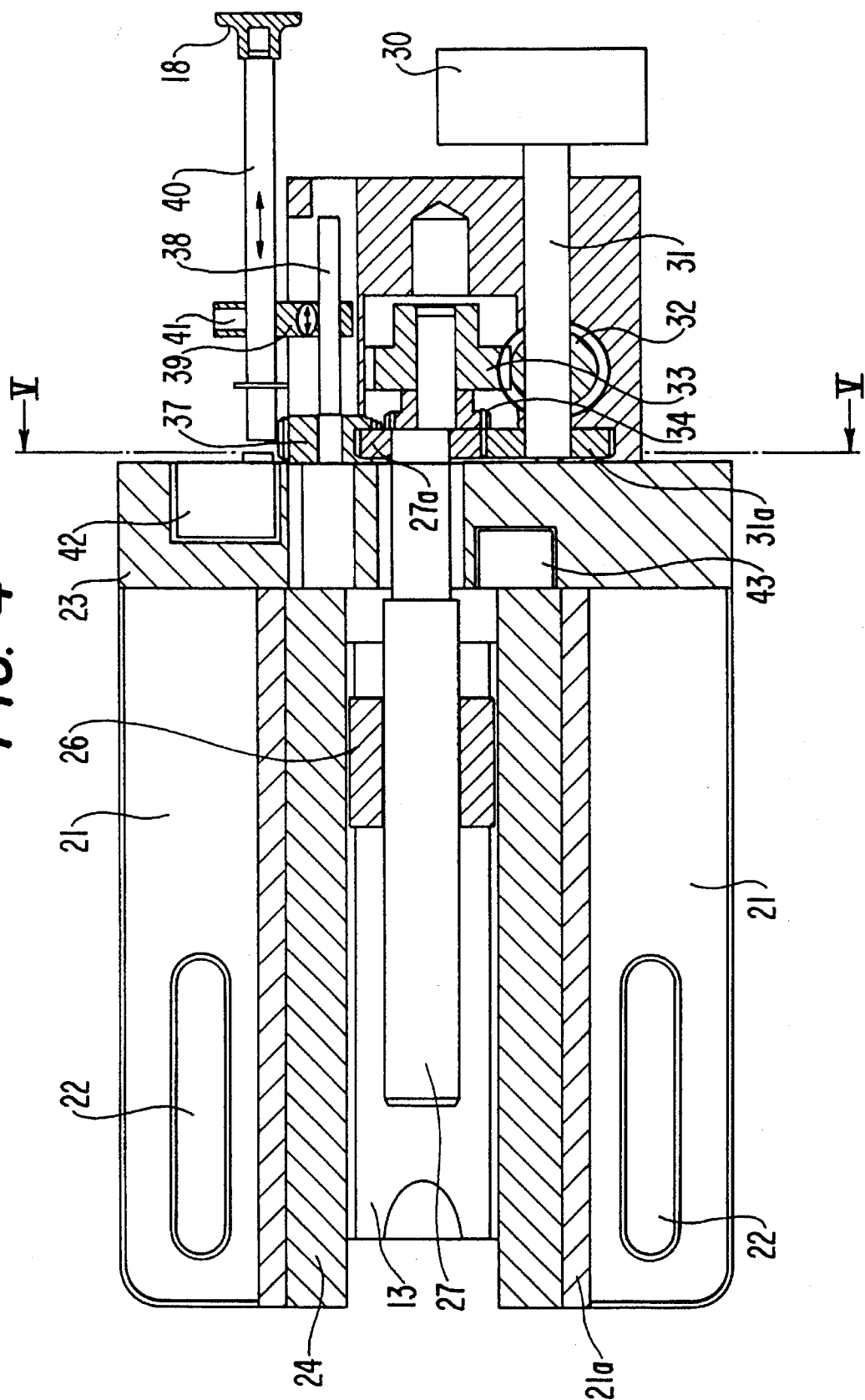
FIG. 4 is a partly sectional side view of the resurfacing unit on a larger scale, so that the most essential parts are visible.

In FIG. 4 is seen a sectional side view of the housing 21 where the threaded spindle 27 for the sliding holders 13 with the threaded sleeve 26 are clearly visible. The threaded spindle 27 reaches through the motor plate 23 and ends in a toothed wheel 27a. The electric DC-geared motor 30 with built-in reduction gear and an output shaft 31 with a toothed wheel 31a is mounted on the motor plate 23. Additionally, an axle 32 from the hand wheel 12 is shown in engagement with a toothed wheel 33 which is coupled to another toothed wheel 34. In addition to this is shown one of several intermediate toothed wheels 37, in that the intermediate toothed wheel 37 shown is coupled to a further threaded spindle 38.

The threaded spindle 38 comprises a positioning member 39 in the form of a metal member with a threaded hole so that the positioning member 39 can be guided along the threaded spindle 38 when this is rotated. Thus, the positioning member 39 is always in a position on the spindle 38 which reflects the position of the tools 15 accurately. Through a transverse hole the positioning member 39 is coupled to an axle 40. This coupling comprises a friction adjustment screw 41 providing the possibility of displacing the axle 40 in relation to the positioning member 39 by means of the setting device 18. At the end of the axle 40 is shown a microswitch 42 which can be actuated by the axle 40 if this is guided towards the microswitch. The microswitch 42 is arranged to cut off the power to the geared motor 30. Additionally is shown a microswitch 43 which can be actuated by one of the sliding holders 13 when this is guided into the housing 21. The microswitch 43 is also arranged to cut off the power to the geared motor 30.

Figure 5:
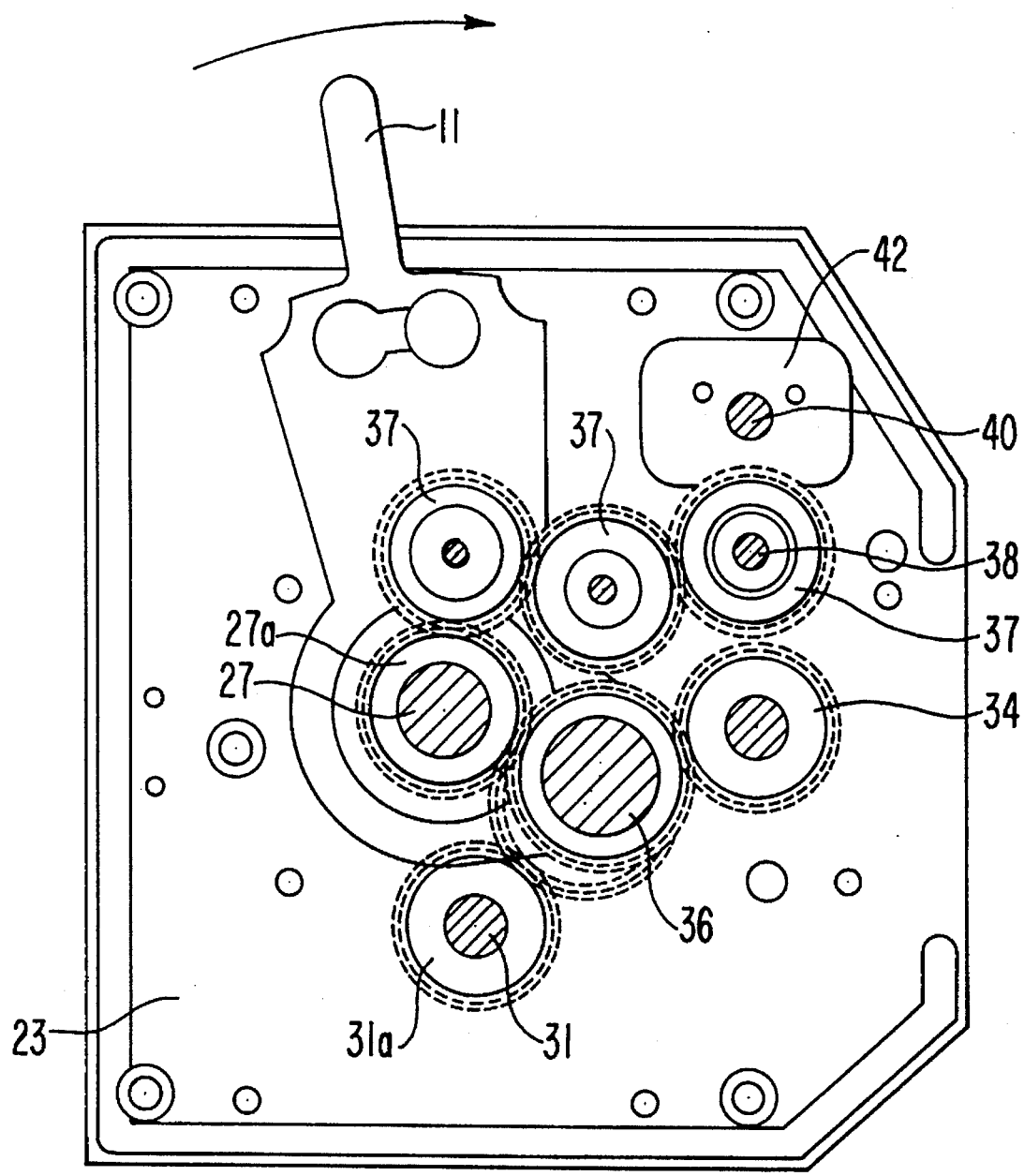
FIG. 5 shows a plane section V—V in FIG. 4.
Figure 6:
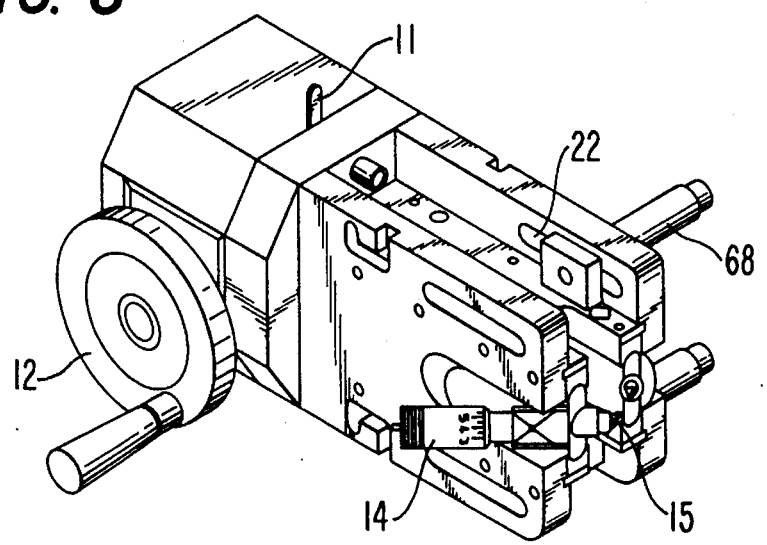
FIG. 6 is a side elevational view of the lathe head as seen from one side of the end of the lathe head carrying the machining tools, a handle of the lathe head having been removed from the lathe head.

FIG. 5 shows the motor plate 23 with the shift lever 11. The shift lever 11 comprises a freely rotatable toothed wheel 36 which by means of the shift lever can be moved between the shown and the sketched positions.

When the shift lever 11 is in the position shown in FIG. 5, the hand wheel (not shown) 12 is coupled to a toothed wheel 27a mounted firmly on the spindle 27 through the toothed wheel 34 and the toothed wheel 36 on the shift lever 11. In the position shown the disc brake lathe unit can be operated manually by means of the hand wheel 12.

If the shift lever 11 is moved to its second position, the toothed wheel 36 becomes disengaged with the toothed wheel 34 and instead it enters into engagement with a toothed wheel 31a mounted on the output shaft 31 from the geared motor 30. A mechanical connection or transmission is now established from the geared motor 30 through the toothed wheel 31a, the toothed wheel 36 to the toothed wheel 27a and thus to the threaded spindle 27. The geared motor 30 can now rotate the spindle 27 for a change of the feeding of the tools 14, 15.

Additionally, three toothed wheels, all marked 37, are shown which are in permanent engagement with each other and with the toothed wheel 27a on the threaded spindle 27. Thus, the toothed wheels 37 always rotate simultaneously with the threaded spindle 27. The threaded spindle 38 explained in connection with FIG. 4 is firmly mounted on the last of the toothed wheels 37.

In use, the disc brake lathe unit 2 is mounted as shown in FIGS. 1 and 2, after which the resurfacing of the brake disc can spindle 27. The threaded spindle 38 explained in connection with FIG. 4 is firmly mounted on the last of the toothed wheels 37.

In use, the disc brake lathe unit 2 is mounted as shown in FIGS. 1 and 2, after which the resurfacing of the brake disc can start with the following sequence of operations, for example.

1) The shift lever 11 is set for manual operation through the hand wheel 12.

2) The rusty edge 1a (see FIG. 2) along the outer rim of the brake disc 1 is removed.

3) The rusty edge 1b (see FIG. 2) at the central opening of the brake disc 1 is removed.

4) While the tools 15 are still in the area 1b, the setting device 18 is adjusted by pushing it as far as possible inward, i.e. until it actuates the microswitch 42.

5) The shift lever 11 is set in its second position, i.e. the position where the geared motor 30 is in engagement with the spindle 27.

6) The tool holders 14 are set in such a manner that a chip of approximately 1/10 mm can be removed from both sides of the brake disc 1.

7) The 3-position switch 17 is set in the position "outfeed" and the resurfacing of the brake disc 1 is started.

9) The tool holders 14 are set for a further chip of approximately 1/20 mm and the 3-position switch 17 is set in the position "infeed", after which the second and final resurfacing of the brake disc is started, as the geared motor 30 starts.

10) When the microswitch 42 is actuated by the axle 40, the geared motor 30 stops automatically and the resurfacing of the brake disc 1 is finished. Because of the friction between the axle 40 and the positioning member 39, the position of the axle 40 is as set in stage 4 is "remembered", so that the geared motor 30 will always stop before the tools 15 reach too far towards the center of the brake disc 1.

Figure 9:
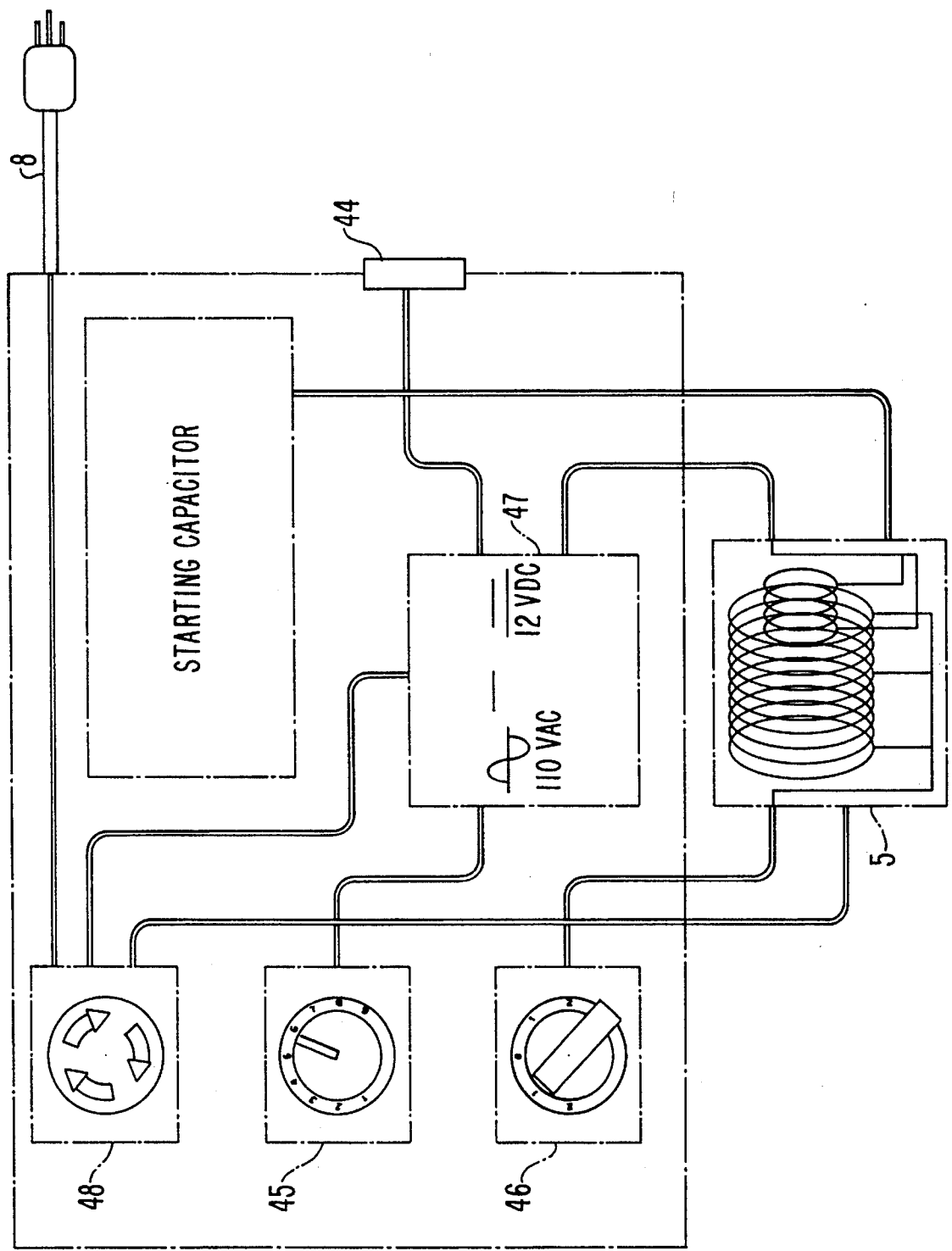
FIG. 9 is a schematic electrical diagram of the power drive unit of the brake disc lathe of FIG. 1.
Figure 10:
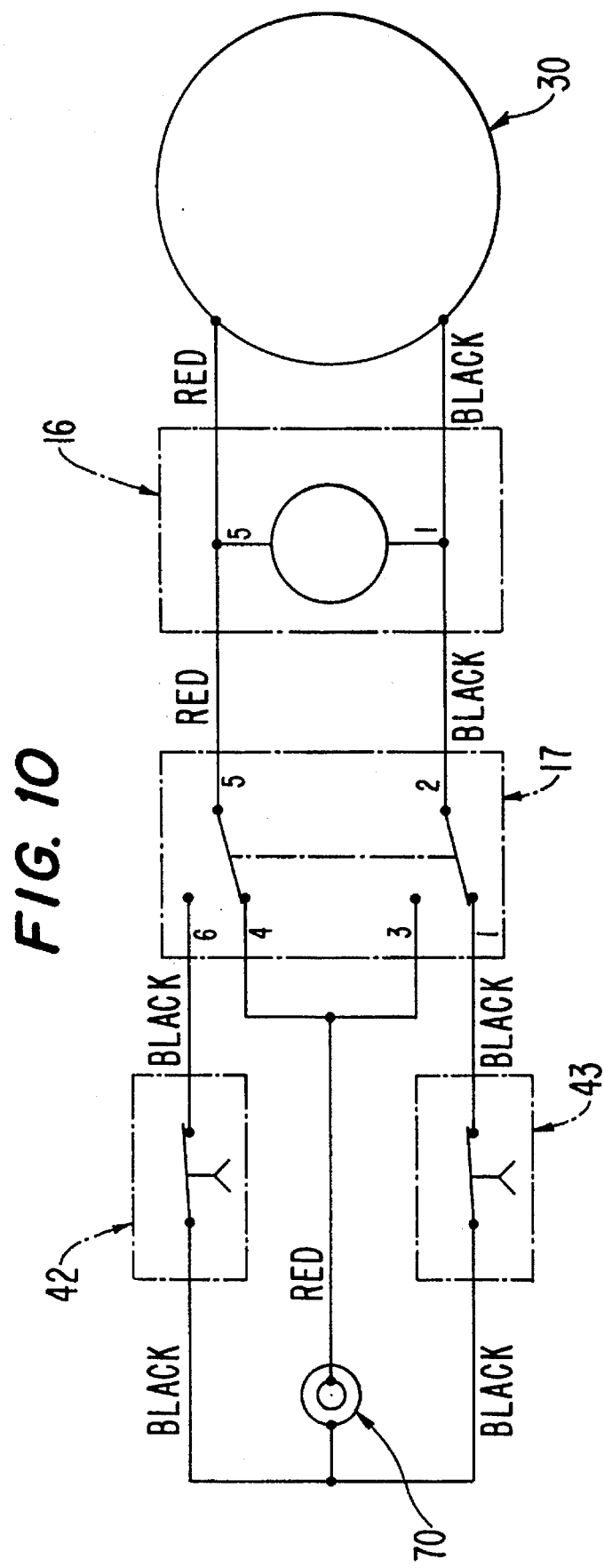
FIG. 10 is a schematic electrical diagram of the lathe head of the disc brake lathe of FIG. 1.

When the lathe head 2 is mounted on the car in the manner shown in FIG. 1, the lathe head is subject to water or moisture dripping down from the wheel well of the car, especially during the winter months. In regard, to improved safety as it pertains to an electrical hazard, the present invention provides that the lathe head 2 is powered by relatively safe, low voltage, 12–24 volt DC power, preferably 12 volt DC power as noted above. This low voltage DC power is supplied by converting or transforming the relatively higher voltage, 110–220 volt AC power, 110 volt AC power in the disclosed embodiment, to the power drive unit 3, then supplying the lathe head through the low voltage electric cable 9 by way of unit 7. A schematic, power diagram of unit 7 controlling and supplying electrical power from the 110 volt power cord 8 to a socket 44 which receives one end of the electric cable 9 is illustrated in FIG. 9 of the drawings.

Figure 8:
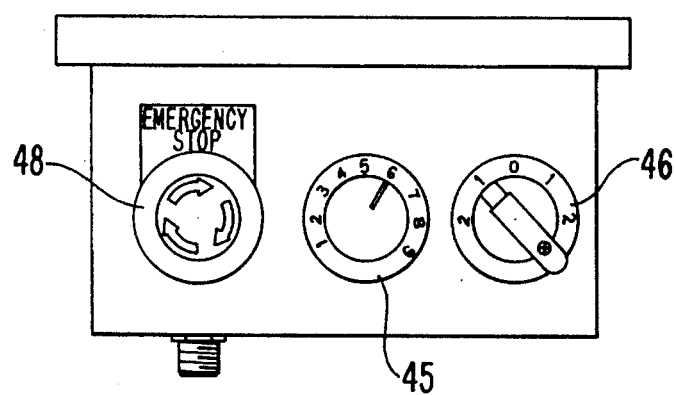
FIG. 8 is a side elevational view of a portion of the power drive unit of the brake disc lathe of FIG. 1, particularly the side of a unit thereof which controls and supplies electrical power to both the lathe head and the motor of the power drive unit for rotating the brake disc, several lathe controls being located on said side of the unit.

The brake disc lathe of the invention is used to machine the surface of brake discs through the controlled removal of metal by rotating the metal brake disc surface past cutting tools 15 of the lathe head 2 as described above. Surface finish quality of the brake disc is dependent on the speed of rotation of the metal surface of the brake disc 1 past the cutting tools 15 and the rate of movement of the cutting tools 15 by the lathe head 2 with respect to the brake disc, referred to as feed. The low voltage connection between the lathe head 2 and the power drive unit 3 provides a means of controlling the feed rate of the tools of the lathe head through a broad variable range and means is also provided for controlling the speed of rotation of the brake disc during machining, also over a broad variable range, with the controls for these being located in one control panel of the unit 7 controlling and supplying power of the power drive unit 3 as depicted in FIGS. 8 and 9. In particular, feed is controlled by a feed rate adjustment switch 45, an infinitely variable potentiometer with markings 1–9 with 1 being the slowest and 9 being the fastest feed rate. The lathe head electric DC-geared motor 30 is controlled by this switch. The direction of rotation of the motor 30 is controlled by the infeed/outfeed selector switch 17 as referred to above, see FIG. 7.

Speed is controlled by an on/off two speed bi-directional switch 46, a five-position selector switch with markings 2-1-0-1-2. The "O" position is zero speed or off. Positions 1 are minimum speed while positions 2 are maximum speed. The power drive unit motor 5 is controlled by this switch. The direction or rotation for this motor is also controlled with this switch. Turning the switch counter-clockwise to 1 or 2 causes rotation in one direction, while turning the switch clockwise causes rotation in the opposite direction.

The 110 volt AC power drive unit motor 5 is a two-speed, capacitor start motor with a special field windings configuration. A low voltage AC potential is supplied from the motor windings which is fed to the AC/DC voltage convertor 47. This solid state convertor regulates the AC voltage to a constant 12 volts DC potential. The feed rate adjustment switch 45 further regulates this voltage between zero and twelve DC for infinite speed control of the lathe head motor 30.

The regulated low voltage from the AC/DC voltage convertor 47 is fed to the socket 44 for the 12 volt cable 9. The cable 9 is a spiral-formed, two-conductor cable with jacks on each end that connects between the lathe head 2 at socket 70 and the power drive unit 3. Thus, the lathe head 2 is never at a voltage above 12 volts DC for operator protection in case of a circuit malfunction. As noted above, this is especially important since the surrounding environment is typically wet when brake discs are machined due to residual rain or melting snow and ice on the vehicle.

The control panel of the unit 7 of the power drive unit 3 is also provided with an emergency stop button 48. Pressing this button disconnects power from the entire system, e.g. both the power drive unit 3 and the disc brake lathe head 2 so that all rotating and transverse motions of the lathe head and power drive unit are stopped. The button 48 stays in the pressed, deactivated position until the button is twisted, in the direction indicated by the arrows embossed on the knob as shown in FIGS. 8 and 9, and allowed to spring out to the activated position. Thus, the emergency stop button 48 allows the brake disc lathe of the invention to be stopped should its continued operation pose a safety hazard to the operator as, for example, where an operator's clothing or a power cord has become entangled in a rotating part.

The low voltage connection between the lathe head 2 and the power drive unit 3 of the brake disc lathe of the invention allows for increased functionality through a system that provides a means of controlling the feed rate of the lathe head 2 through a broad variable range and a means of controlling the speed of rotation of the power drive shaft 4, also over a broad variable range, with the controls both located in one control panel on the unit 7 of the power drive unit. By allowing for an almost infinite range of adjustment of both feed and speed, any surface finish can be achieved during the final cut without losing the flexibility of maximum speed during preliminary rough cuts. That is, as surfaces are machined, two types of cuts are commonly referred to: rough and finish.. Low-speed combined with high-feed gives a rough cut while high-speed with a low-feed gives a finish cut. Incremental variations of cut characteristics are directly related to variable combinations of feeds and speeds between these two extremes. In addition, this control of the brake lathe of the invention allows the operator to modify the frequency of vibration during machining to avoid vibration resonance and the resulting poor finish often common on conventional light weight on-the-vehicle lathes such as that in U.S. Pat. No. 4,226,146.

The elimination or reduction of the problem of vibration of the brake lathe according to the invention is also aided by the provision of a vibration dampener 50 which can be used on the lathe head 2 to eliminate or reduce vibration thereof, thereby allowing increased speed and improved surface finish. As illustrated in FIGS. 11 and 12, the vibration dampener 50 is mounted on the housing 21 of the lathe head 2 in place of the handle 20 by way of mounting brackets 51 which are received in slots 52 in the housing 21. The vibration dampener 50 in the illustrated embodiment provides a means of energy absorption including a free mass in the form of a steel ball 53 connected to a stationary mass in the form of a tube 54 by a viscous liquid 55 contained in tube 54. The inertia of the free mass reduces the amplitude of vibration by providing a countervailing force to the vibration of the brake disc during machining and the hysteresis of the viscous friction against movement of the steel ball 53 absorbs energy. The vibration dampener 50 is attached to the lathe head 2 in a direction transverse to the direction of feed of the cutting tools 15. In a variation of the vibration dampener, the free mass could be connected to the stationary mass by rubber in shear rather than by the viscous liquid 55.

Figure 13:
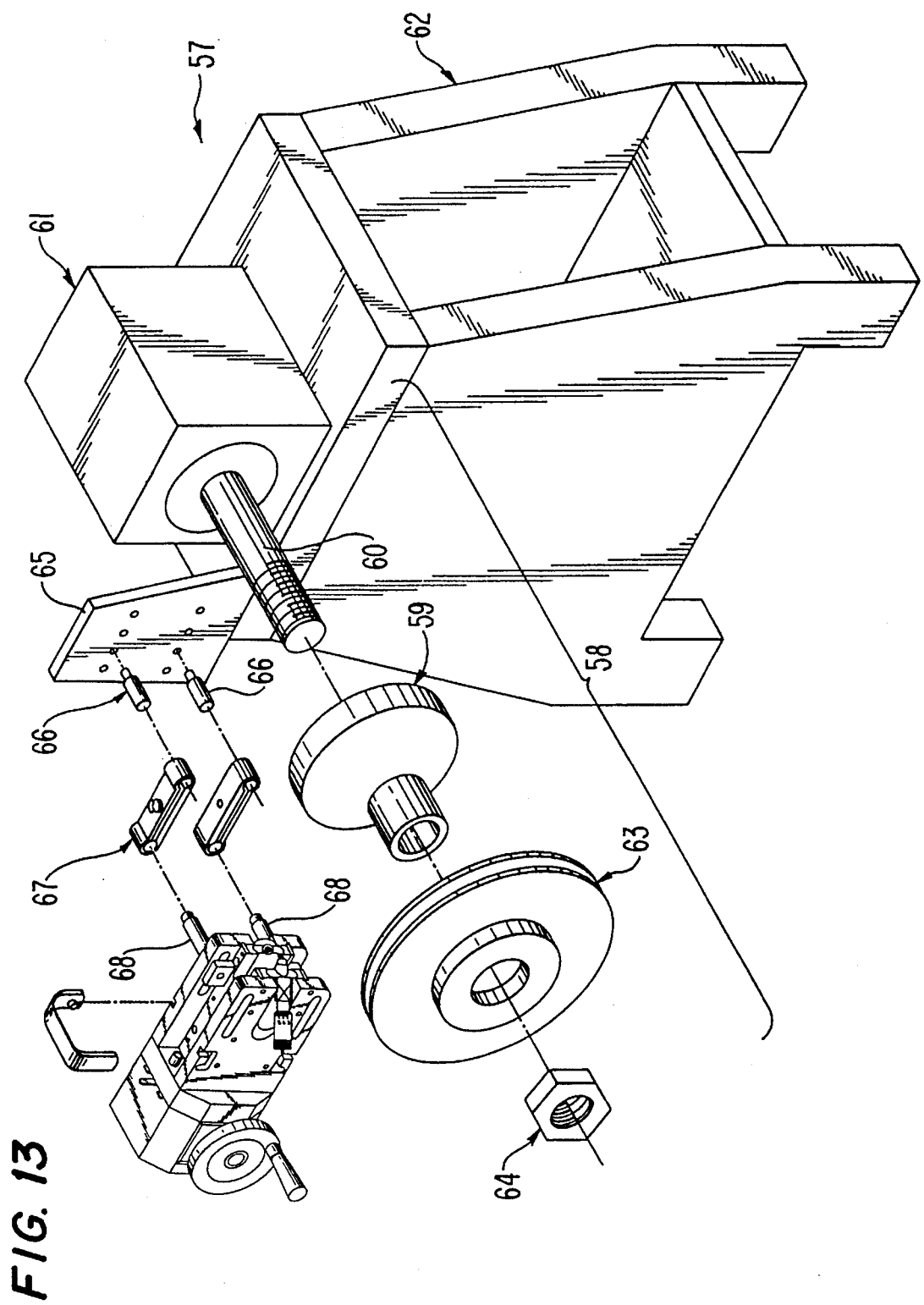
FIG. 13 is a side view of the lathe head of FIG. 1 in combination with a bench mounted power drive unit of the lathe for rotating a brake disc which has been removed from a vehicle, the drawing depicting the manner in which the lathe head of FIG. 1 is adapted to be attached to the bench mounted power drive for use therewith.

The brake disc lathe of the present invention can further include the bench mounted power drive unit 57 shown in FIG. 13 for rotating a brake disc 2 which has been removed from the vehicle. The brake disc 2 is mounted on a holding device 58 of the unit 57 for rotation by the power drive unit 57. In particular, a disc adapter 59 is positioned on an output shaft 60 of a drive motor 61 mounted on a stand 62 of the bench mounted power drive unit 57. A brake rotor or disc 63 is supported on the disc adapter 59 and held thereon by collet nut 64 The lathe head 2 of the brake disc lathe of the invention is attached to the bench mounted power drive 57 at a mounting plate 65 secured to the stand 62 by way of threaded adapters 66, twin cylinder mounting adapter 67, and mounting adapters 68 secured in mounting holes 22 of housing 21 of the lathe head.

These features of the invention allow the lathe head to be used as a machining mechanism with a bench mounted power drive unit for machining brake discs off the vehicle thereby expanding the use of the brake disc lathe of the invention. As an additional feature, not shown, the bench mounted power drive 57 can also be adapted to machine brake drums by the addition of a simple cutting tool carriage that travels in an axis parallel to the axis of output shaft 60.

As a result of the aforementioned combination of features of the improved brake disc lathe of the invention, the brake lathe rivals a bench mount brake lathe in functional capability and speed while permitting on-the-vehicle machining of brake discs in a manner in which allows increased speed and improved surface finish by reducing or eliminating the problem of vibration, and while enhancing operator safety.

While we have shown and described one embodiment in accordance with the present invention, it is understood that the same is not limited thereto, but is susceptible to numerous changes and modifications as known to those skilled in the art. Therefore, we do not wish to be limited to the details shown and described herein, but intend to cover all such changes and modifications as encompassed by the scope of the appended claims.

We claim:

1. A disc brake lathe for machining a brake disc of a vehicle without removing the brake disc from the vehicle but only the wheel and other parts of the brake mechanism, said lathe comprising:

a power drive unit for rotating a brake disc on a vehicle; and a lathe head having at least one cutting tool for machining the brake disc while the brake disc on the vehicle is rotated by said power drive unit, said lathe head being adapted to be mounted on the vehicle for machining the brake disc on the vehicle and said lathe head including a reversible, low voltage DC electric motor for power feeding of said at least one cutting tool during machining in each of two opposite directions depending upon the direction of operation of said reversible motor, transmission means drivingly connecting said motor and said at least one cutting tool for power feeding said at least one cutting tool in each of said two opposite directions as a function of the direction of operation of said motor, and said lathe head further including a means for dampening transverse vibration, said means for dampening being attached to the lathe head for damping vibration transverse to said two opposite directions of power feeding of said at least one cutting tool for improving the surface finish of brake discs machined with said lathe.

2. The disc brake lathe according to claim 1, wherein said transverse vibration dampening means comprises a free mass which is connected to a stationary mass by way of an energy absorbing medium, said stationary mass being secured on said lathe head.

3. The disc brake lathe according to claim 2, wherein said energy absorbing medium is one of rubber and a viscous material, the inertia of said free mass reducing the amplitude of transverse vibration of the lathe head by providing a countervailing force to the vibration of the brake disc during machining with the hysteresis of said energy absorbing medium absorbing energy.

4. The disc brake lathe according to claim 2, wherein said transverse vibration dampening means comprises an assembly of a metal ball inside a tube filled with a viscous liquid, said assembly being attached to said lathe head so that said tube extends in a direction transverse to a said directions of feed of said at least one tool during machining.

5. The disc brake lathe according to claim 1, further comprising means for adjusting the frequency of vibration of the lathe head during machining so that the amplifying effects of resonance can be avoided.

6. The disc brake lathe according to claim 5, wherein said means for adjusting the frequency of vibration of the lathe head includes means for adjusting the rate of said power feeding of said at least one cutting tool during machining and means for adjusting the speed at which said power drive unit rotates said brake disc.

7. The disc brake lathe according to claim 6, wherein operator controls for said means for adjusting the rate of power feeding of said at least one cutting tool during machining and for said means for adjusting the speed at which said power drive unit rotates said brake disc are located on said power drive unit.

8. The disc brake lathe according to claim 7, further comprising an emergency stop actuator on said power drive unit for actuation by an operator to stop both feeding of said at least one tool of said lathe head and rotation of said brake disc by said power drive unit.

9. The disc brake lathe according to claim 1, wherein said lathe head further comprises a hand wheel for manual feeding said at least one cutting tool, and wherein said transmission means includes means for selectively disconnecting said transmission means from said motor and connecting said transmission means with said hand wheel for manual feeding said at least one cutting tool in each of said two opposite directions as a function of the direction of rotation of said hand wheel.

10. The disc brake lathe according to claim 1, wherein said two opposite directions of power feeding of said at least one cutting tool are an infeed direction where said at least one cutting tool moves toward the center of a brake disc being machined, and an outfeed direction where said at least one cutting tool moves toward an outer rim of said brake disc being machined, and wherein said lathe head further comprises first stop means for automatically stopping the power feeding of said at least one cutting tool in said outfeed direction at a predetermined position, second stop means for automatically stopping the power feeding of said at least one cutting tool in said infeed direction at a predetermined position, and means for adjusting the location of said predetermined position at which the power feeding of said at least one cutting tool in the infeed direction is stopped.

11. The disc brake lathe according to claim 1, wherein said power drive unit includes a reversible variable speed motor and control means for selecting the direction of rotation of said motor and the speed of rotation of said motor for rotating a brake disc on a vehicle.

12. The disc brake lathe according to claim 1, wherein said low voltage DC electric motor is powered by 12–24 volt DC electric power.

13. A disc brake lathe for machining a brake disc of a vehicle without removing the brake disc from the vehicle but only the wheel and other parts of the brake mechanism, said disc brake lathe comprising:

a power drive unit for rotating a brake disc on the vehicle; and a lathe head having at least one cutting tool for machining the brake disc while the brake disc on the vehicle is rotated by said power drive unit, said lathe head being adapted to be mounted on the vehicle for machining the brake disc on the vehicle and said lathe head including a reversible, low voltage DC electric motor for power feeding of said at least one cutting tool during machining in each of two opposite directions depending upon the direction of operation of said reversible motor and means for adjusting the frequency of vibration of the lathe head during machining so that the amplifying effects of resonance can be avoided and wherein said two opposite directions of power feeding of said at least one cutting tool are an infeed direction where said at least one cutting tool moves toward the center of a brake disc being machined, and an outfeed direction where said at least one cutting tool moves toward an outer rim of said brake disc being machined, and wherein said lathe head further comprises first stop means for automatically stopping the power feeding of said at least one cutting tool in said outfeed direction at a predetermined position, second stop means for automatically stopping the power feeding of said at least one cutting tool in said infeed direction at a predetermined position, and means for adjusting the location of said predetermined position at which the power feeding of said at least one cutting tool in the infeed direction is stopped.

14. The disc brake lathe according to claim 13, wherein said means for adjusting the frequency of vibration of the lathe head includes means for adjusting the rate of power feeding of said at least one cutting tool during machining and means for adjusting the speed at which said power drive unit rotates said brake disc.

15. The disc brake lathe according to claim 14, wherein operator controls for said means for adjusting the rate of power feeding of said at least one cutting tool during machining and for said means for adjusting the speed at which said power drive unit rotates said brake disc are located on said power drive unit.

16. The disc brake lathe according to claim 15, further comprising an emergency stop actuator on said power drive unit for actuation by an operator to stop both feeding of said at least one tool of said lathe head and rotation of said brake disc by said power drive unit.

17. A disc brake lathe for machining a brake disc of a vehicle while the brake disc is either on or off the vehicle, said lathe comprising, in combination:

a first part drive unit for rotating a brake disc on a vehicle;

a second, bench mounted power drive unit for rotating a brake disc off the vehicle; and a lathe head having at least one cutting tool for machining the brake disc while the brake disc is rotated by a selected one of said first power drive unit and said second, bench mounted power drive unit, said lathe head being adapted to be mounted on the vehicle for machining the brake disc on the vehicle, and said lathe head including a reversible, low voltage DC electric motor for power feeding of said at least one cutting tool during machining in each of two opposite directions depending upon the direction of operation of said reversible motor, wherein at least one fastener is provided for attaching said lathe head to said second bench mounted power drive unit to permit machining of a brake disc off the vehicle, wherein said two opposite directions of power feeding of said at least one cutting tool are an infeed direction where said at least one cutting tool moves toward the center of a brake disc being machined, and an outfeed direction where said at least one cutting tool moves toward an outer rim of said brake disc being machined, and wherein said lathe head further comprises first stop means for automatically stopping the power feeding of said at least one cutting tool in said outfeed direction at a predetermined position, second stop means for automatically stopping the power feeding of said at least one cutting tool in said infeed direction at a predetermined position, and means for adjusting the location of said predetermined position at which the power feeding of said at least one cutting tool in the infeed direction is stopped.

18. The disc brake lathe according to claim 17, wherein said lathe head further comprises means for reducing vibration of the lathe head which is transverse to said two opposite feed directions during machining.

19. The disc brake lathe according to claim 18, wherein said means for reducing vibration includes a vibration dampener attached to the lathe head.

20. The disc brake lathe according to claim 18, wherein said means for reducing vibration includes means for adjusting the frequency of vibration of the lathe head during machining.

* * * * *